July 1, 1930. A. POPPE 1,768,785

BALL CASTER

Filed Jan. 5, 1928

Inventor
Alfred Poppe
By Frank Keipes
Attorney

Patented July 1, 1930

1,768,785

UNITED STATES PATENT OFFICE

ALFRED POPPE, OF ROCHESTER, NEW YORK

BALL CASTER

Application filed January 5, 1928. Serial No. 244,710.

The object of this invention is to provide a new type of ball caster in which the ball is supported by a series of concaved rollers that are mounted to rotate in a fixed angular frame which provides an efficient and inexpensive mounting for the rollers.

Another object of this invention is to construct the supporting frame of the rollers so that a perfect bearing surface is provided for each of the rollers.

Another object of this invention is to provide a suitable cradle for the support of the frame carrying the rollers that will hold the frame and its rollers in a predetermined position in the caster frame.

These and other objects of this invention will be fully illustrated in the drawing, described in the specification and pointed out in the claim at the end thereof.

In the accompanying drawing.

In the several figures of the drawing like reference numerals indicate like parts.

Figure 1:
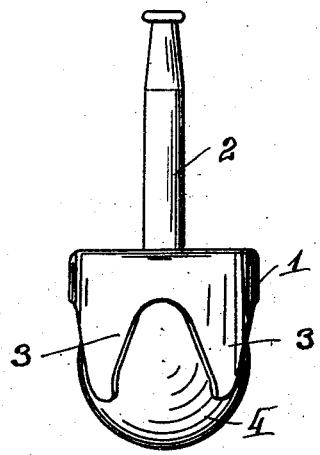
Figure 1 is a side elevation of the improved ball caster.
Figure 2:
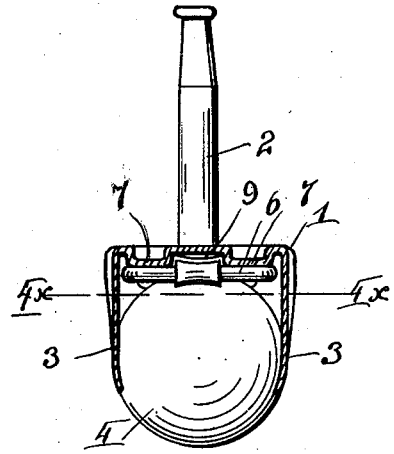
Figure 2 is a vertical sectional view of the ball caster, the section being taken on the line $2^x$, $2^x$ of Figure 4.
Figure 3:
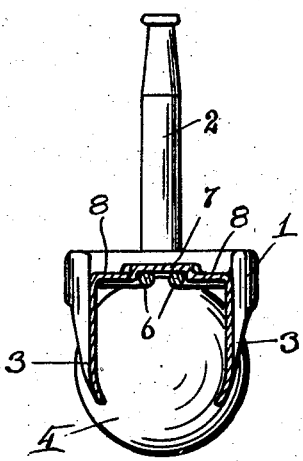
Figure 3 is a vertical sectional view of the improved ball caster, the section being taken on the line $3^x$, $3^x$ of Figure 4.

This invention is an improvement over similar ball casters that are supported by rollers or balls in that the supporting frame for the rollers is constructed in such a manner that the bearing provided for each of the rollers provides a perfect bearing surface for the rollers so that the rollers in turn provide a good roller bearing surface for the ball.

In its preferred form the ball caster comprises the cylindrical shell 1 which is closed at the top where the stem 2 or other fastening means is attached thereto. Suitable prongs 3, 3 are formed as part of the shell 1 which prongs project downwardly and are curved inwardly at their lower end to partially embrace the ball 4 and hold it in place in the shell 1.

Within the shell 1 the ball is supported by the concaved rollers 5, 5 which in turn are mounted to rotate on the angular frame 6 that is bent up from rod stock in the manner illustrated in the figures of the drawings.

In this way the shaft or pivot for each of the rollers is combined with or made a part of the frame which holds the rollers in place as well as supports the rollers against the pressure from the ball. The angular shape of the pivot frame for the rollers provides a straight bearing for each of the rollers so that the rollers can be made of considerable length in order to increase the bearing surface provided by them. The straight bearing also makes it possible to provide a very accurately fitting bearing surface for the full length of each of the rollers so that these rollers run perfectly true on the pivot formed by the straight sections of the angular frame 6.

The closed top of the cylindrical shell 1 is indented in order to form a suitable supporting cradle for the angular frame 6 that holds the frame against turning in the shell as well as properly spaces the rollers on the angular frame with relation to each other and the ball 4 for which they form the roller bearing. The indentations therefore extend to two depths and form the depending lugs 7 and 8 respectively. Of these lugs 7 form the supporting ledges on which the corners of the angular frame 6 are supported while lugs 8 extend beyond these ledges on the outside of the frame 6 and hold the frame against rotation within the cylindrical shell. The formation of the lugs 7 and 8 provide the radial channels 9, 9 between them and into these channels project the rollers 5, 5 so that they are held in a predetermined position on the frame 6. In this position the rollers are held against the surface of the ball so that they provide a true rolling contact with the ball over their full length and rotate on the frame whenever the ball is rotated in the direction in which the axis of the roller permits them to rotate.

Figure 4:
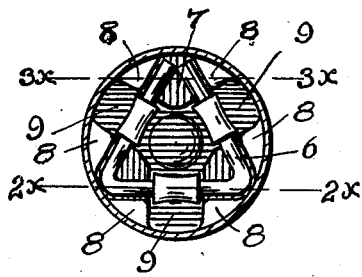
Figure 4 is a horizontal sectional view of the ball caster, the section being taken on the line $4^x$, $4^x$ of Figure 2.
Figure 5:
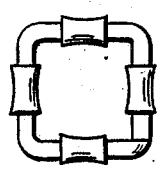
Figure 5 is a top plan view of a modified form of roller bearing for the improved ball caster.

In Figure 5 I have illustrated a modified form of the supporting frame for the rollers. The supporting frame in this figure is rectangular in outline instead of being in the form of an equilateral triangle as is illustrated in Figure 4. This illustrates that within reasonable limits any angular form of frame having more than three sides may be used for the support of the rollers.

I claim:

A ball caster comprising a cylindrical shell, a ball held in place in said shell, a series of concave rollers supported by said ball, an independent angular frame for said rollers, said frame having a plurality of straight sides with one roller on each of said sides, the straight sides of said frame forming the axis for said rollers, said angular frame being bent from a straight rod with rollers placed on the rod before bending, the ends of the rod being brought together at a corner, supporting ledges formed in said cylindrical shell supported by said angular frame on each side of said rollers and lugs projecting from said ledges on the outside of said angular frame to prevent the rotation of said angular frame within said cylindrical shell.

In testimony whereof I affix my signature.

ALFRED POPPE.